US011535714B2

(12) United States Patent
Kao et al.

(10) Patent No.: US 11,535,714 B2
(45) Date of Patent: Dec. 27, 2022

(54) LIGHT-CURABLE SILOXANE RESINS FOR ADDITIVE MANUFACTURING

(71) Applicant: Carbon, Inc., Redwood City, CA (US)

(72) Inventors: Joseph Kao, Foster City, CA (US); Xinyu Gu, San Mateo, CA (US)

(73) Assignee: Carbon, Inc., Redwood City, CA (US)

( * ) Notice: Subject to any disclaimer, the term of this patent is extended or adjusted under 35 U.S.C. 154(b) by 160 days.

(21) Appl. No.: 16/759,783

(22) PCT Filed: Nov. 13, 2018

(86) PCT No.: PCT/US2018/060615
§ 371 (c)(1),
(2) Date: Apr. 28, 2020

(87) PCT Pub. No.: WO2019/099347
PCT Pub. Date: May 23, 2019

(65) Prior Publication Data
US 2020/0332066 A1    Oct. 22, 2020

Related U.S. Application Data

(60) Provisional application No. 62/588,656, filed on Nov. 20, 2017, provisional application No. 62/629,766, filed on Feb. 13, 2018.

(51) Int. Cl.
| | | |
|---|---|---|
| *C08K 5/37* | (2006.01) | |
| *C08G 77/16* | (2006.01) | |
| *B33Y 10/00* | (2015.01) | |
| *B33Y 70/00* | (2020.01) | |
| *B29C 64/124* | (2017.01) | |
| *C08L 83/04* | (2006.01) | |
| *B33Y 70/10* | (2020.01) | |
| *C08G 77/20* | (2006.01) | |
| *C08G 77/00* | (2006.01) | |

(52) U.S. Cl.
CPC ............ *C08G 77/16* (2013.01); *B29C 64/124* (2017.08); *B33Y 10/00* (2014.12); *B33Y 70/00* (2014.12); *B33Y 70/10* (2020.01); *C08K 5/37* (2013.01); *C08L 83/04* (2013.01); *C08G 77/20* (2013.01); *C08G 77/70* (2013.01)

(58) Field of Classification Search
None
See application file for complete search history.

(56) References Cited

U.S. PATENT DOCUMENTS

| | | | |
|---|---|---|---|
| 3,213,058 A | 10/1965 | Boyle et al. | |
| 4,785,075 A | 11/1988 | Shimp | |
| 5,196,137 A | 3/1993 | Merchant | |
| 5,236,637 A | 8/1993 | Hull | |
| 5,391,072 A | 2/1995 | Lawton et al. | |
| 5,506,007 A | 4/1996 | Williams et al. | |
| 5,529,473 A | 6/1996 | Lawton et al. | |
| 5,773,403 A | 6/1998 | Hijino et al. | |
| 5,824,634 A | 10/1998 | Merchant | |
| 6,008,179 A | 12/1999 | Flynn et al. | |
| 6,063,206 A | 5/2000 | Latta | |
| 6,288,018 B1 | 9/2001 | Flynn et al. | |
| 6,426,327 B1 | 7/2002 | Flynn et al. | |
| 6,646,020 B2 | 11/2003 | Nyberg et al. | |
| 6,689,734 B2 | 2/2004 | Doyel et al. | |
| 6,699,829 B2 | 3/2004 | Doyel et al. | |
| 6,753,304 B1 | 6/2004 | Barthelemy et al. | |
| 6,861,475 B2 | 3/2005 | Ilenda et al. | |
| 6,916,867 B2 | 7/2005 | Gugumus | |
| 7,157,586 B2 | 1/2007 | Wood et al. | |
| 7,183,248 B2 | 2/2007 | Manning, Jr. | |
| 7,438,846 B2 | 10/2008 | John | |
| 7,625,977 B2 | 12/2009 | Lutz et al. | |
| 7,642,316 B2 | 1/2010 | Rego et al. | |
| 7,695,643 B2 | 4/2010 | Fritzsche et al. | |
| 7,892,474 B2 | 2/2011 | Shkolnik et al. | |
| 7,897,558 B1 | 3/2011 | Arafat | |
| 8,088,245 B2 | 1/2012 | Lutz et al. | |
| 8,110,135 B2 | 2/2012 | El-Siblani | |
| 8,765,108 B2 | 7/2014 | Lalleman | |
| 9,023,782 B2 | 5/2015 | Peitersen et al. | |

(Continued)

FOREIGN PATENT DOCUMENTS

| | | |
|---|---|---|
| JP | 2010185991 A | 8/2010 |
| WO | 1994/004582 | 3/1994 |

(Continued)

OTHER PUBLICATIONS

Wallin, T. J., et al. "Click chemistry stereolithography for soft robots that self-heal." Journal of Materials Chemistry B 5.31 (2017): 6249-6255. (Year: 2017).*

Supporting information for Wallin, T. J., et al. "Click chemistry stereolithography for soft robots that self-heal." Journal of Materials Chemistry B 5.31 (2017): 6249-6255. 7 pages. (Year: 2017).*

International Search Report and Written Opinion corresponding to PCT/US2018/060615, dated Jan. 29, 2019 (11 pp).

Janusziewcz et al. "Layerless fabrication with continuous liquid interface production" Proceedings of the National Academy of Sciences USA, 113(42):11703-11708 (2016).

(Continued)

*Primary Examiner* — Robert S Loewe

(74) *Attorney, Agent, or Firm* — Myers Bigel, P.A.

(57) ABSTRACT

Provided is a polymerizable liquid (or "resin") for producing three-dimensional objects by additive manufacturing, which may include one or more of: (a) a polyvinyl siloxane; (b) a polythiol crosslinker; (c) a photoinitiator (e.g., a free radical photoinitiator); (d) optionally, a urethane (meth)acrylate oligomer; (e) optionally, a reactive diluent; (f) optionally, but in some embodiments preferably, a pigment or dye; (g) optionally, but in some embodiments preferably, a reactive or non-reactive filler; and (h) optionally, an odor scavenger.

20 Claims, No Drawings

(56) References Cited

U.S. PATENT DOCUMENTS

| | | |
|---|---|---|
| 9,068,152 B2 | 6/2015 | Klinkhammer et al. |
| 9,090,765 B2 | 7/2015 | Schall et al. |
| 9,095,787 B2 | 8/2015 | Panandiker et al. |
| 9,120,997 B2 | 9/2015 | Sadlowski et al. |
| 9,121,000 B2 | 9/2015 | Burkinshaw et al. |
| 9,175,248 B2 | 11/2015 | Klinkhammer et al. |
| 9,198,847 B2 | 12/2015 | Peffly et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,598,606 B2 | 3/2017 | Rolland et al. |
| 9,676,963 B2 | 6/2017 | Rolland et al. |
| 9,834,679 B2 * | 12/2017 | Srikanth ................. C08L 83/04 |
| 11,348,157 B1 * | 5/2022 | Grosman ........... G06Q 30/0635 |
| 2008/0258345 A1 | 10/2008 | Bens et al. |
| 2013/0292862 A1 | 11/2013 | Joyce |
| 2013/0295212 A1 | 11/2013 | Chen et al. |
| 2015/0184039 A1 | 7/2015 | Lutz et al. |
| 2015/0215430 A1 | 7/2015 | Votour |
| 2015/0240113 A1 | 8/2015 | Pratt et al. |
| 2016/0128909 A1 * | 5/2016 | Fontein ................. A61K 6/887 |
| | | 523/116 |
| 2017/0283655 A1 * | 10/2017 | Kenney ................. B33Y 10/00 |
| 2017/0291357 A1 | 10/2017 | Fong et al. |
| 2018/0079904 A1 * | 3/2018 | Ono ........................ C08G 77/20 |
| 2018/0162052 A1 * | 6/2018 | Pearlson ............... B29C 44/022 |
| 2018/0327594 A1 * | 11/2018 | Ogawa ................... C08G 77/28 |
| 2020/0032062 A1 * | 1/2020 | Wallin .................... C08L 83/04 |
| 2020/0216692 A1 | 7/2020 | Studart et al. |

FOREIGN PATENT DOCUMENTS

| | | | |
|---|---|---|---|
| WO | 2013160252 A2 | 10/2013 | |
| WO | 2015/164234 | 10/2015 | |
| WO | 2016044547 A1 | 3/2016 | |
| WO | 2016/133759 | 8/2016 | |
| WO | 2016/145182 | 9/2016 | |
| WO | 2016148890 A1 | 9/2016 | |
| WO | WO-2016163333 A1 * | 10/2016 | ............. C08G 77/06 |
| WO | 2017/112483 | 6/2017 | |
| WO | 2019053258 A1 | 3/2019 | |

OTHER PUBLICATIONS

Tubleston et al "Continuous liquid interface production of 3D objects" Science, 347(6228):1349-1352 (2015).

* cited by examiner

LIGHT-CURABLE SILOXANE RESINS FOR ADDITIVE MANUFACTURING

CROSS REFERENCE TO RELATED APPLICATIONS

This application is a 35 U.S.C. § 371 national phase application of International Application Serial No. PCT/US2018/060615, filed Nov. 13, 2018, which claims priority to U.S. Provisional Application Ser. Nos. 62/588,656 and 62/629,766, filed Nov. 20, 2017, and Feb. 13, 2018, respectively, the entire contents of which are hereby incorporated by reference.

FIELD OF THE INVENTION

The present invention concerns resins and methods for additive manufacturing, particularly for stereolithography techniques such as continuous liquid interface production.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; J. Tumbleston, D. Shirvanyants, N. Ermoshkin et al., Continuous liquid interface production of 3D Objects, Science 347, 1349-1352 (2015); see also Rolland et al., U.S. Pat. Nos. 9,676,963, 9,453,142, and 9,598,606).

In the "dual cure" compositions for additive manufacturing, the light polymerizable resins usually comprise methacrylate or acrylate-based oligomers and monomers that undergo free radical chain-growth polymerization during printing. Due to the nature of the chain-growth polymerization mechanism, the molecular weight of the polymer increases rapidly in a short period of time, leading to fast printing speeds and good mechanical strengths in the final parts. However, the evolution of the crosslinked network can be hindered by termination reactions such as oxygen inhibition and radical-radical recombination that compromise the network properties.

In contrast, step-growth polymerization such as thiol-ene radical addition usually requires longer reaction or printing time but has better network homogeneity as the chemistry is less sensitive to oxygen inhibition. Recently, chain-growth and step-growth polymerization mechanisms were combined by including both the thiol-ene resins and (meth)acrylates in the formulations to yield a combination of desirable properties for additive manufacturing (see, e.g., US 2017/0291357 to J. Fong & P. Xu). However, thiol-ene resins that are substantially free of (meth)acrylates have not been widely adopted in three-dimensional printing, in part because the thiol crosslinkers can give a strong odor to the formulations and the final parts.

There is a need for new thiol-ene resin compositions suitable for additive manufacturing.

SUMMARY OF THE INVENTION

A first aspect of the invention is a polymerizable liquid (or "resin") for producing three-dimensional objects by additive manufacturing. The resin may include:
(a) a polyvinyl siloxane;
(b) a polythiol crosslinker;
(c) a photoinitiator (e.g., a free radical photoinitiator);
(d) optionally, a urethane (meth)acrylate oligomer;
(e) optionally, a reactive diluent;
(f) optionally, but in some embodiments preferably, a pigment or dye;
(g) optionally, but in some embodiments preferably, a reactive or non-reactive filler; and
(h) optionally, an odor scavenger.

In some embodiments, the resin is preferably non-aqueous. In some embodiments, the resin is preferably homogeneous.

A second aspect of the invention is a method of making a three-dimensional object by additive manufacturing. The method may include:
(a) providing a polymerizable liquid as described herein above and below; and then
(b) producing a three-dimensional object from the liquid by bottom-up or top-down stereolithography; then
(c) optionally washing the object; and/or
(d) optionally further curing the object (e.g., by heating and/or microwave irradiating the object).

In some embodiments, the producing step is carried out by continuous liquid interface production on an optically transparent window, which window is permeable to an inhibitor of polymerization, which inhibitor forms with the liquid a sustained liquid interface between the object and the window while the object is being produced. In some embodiments, the inhibitor comprises oxygen.

The products may be rigid, flexible, or elastomeric, depending on selection of the particular resin constituents.

In some embodiments, the odor scavenger is present and selected from: (a) an odor absorbent or adsorbent; (b) a blocked isocyanate odor scavenger; (c) a multi-functional epoxy odor scavenger; and (d) combinations of the foregoing.

In some embodiments, the odor scavenger is present and comprises: (a) a combination of (i) at least one absorbent and/or adsorbent and (ii) at least one multi-functional epoxy odor scavenger; or (b) a combination of (i) at least one absorbent and/or adsorbent, and (ii) at least one blocked isocyanate odor scavenger and (iii) at least one multi-functional epoxy odor scavenger.

The foregoing and other objects and aspects of the present invention are explained in greater detail in the specification set forth below. The disclosures of all United States patent references cited herein are to be incorporated herein by reference.

DETAILED DESCRIPTION OF ILLUSTRATIVE EMBODIMENTS

The present invention is now described more fully hereinafter. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

"Free radical photoinitiator" as used herein includes type I free radical photoinitiators, such as phosphineoxide (TPO) or hydroxyacetophenone (HAP), and/or type II free radical photoinitiators, such as a benzophenone photoinitiator (optionally but preferably in combination with a co-initiator (e.g., an alcohol or amine)). Particular examples include, but are not limited to, diphenyl(2,4,6-trimethylbenzoyl)phosphine oxide (TPO), diphenylphosphinyl(2,4,6-trimethylphenyl)methanone; benzophenone; substituted benzophenones; acetophenone; substituted acetophenones; benzoin; benzoin alkyl esters; xanthone; substituted xanthones; diethoxy-acetophenone; benzoin methyl ether; benzoin ethyl ether; benzoin isopropyl ether; diethoxyxanthone; chloro-thioxanthone; N-methyl diethanol-amine-benzophenone; 2-hydroxy-2-methyl-1-phenyl-propan-1-one; 2-benzyl-2-(dimethylamino)-1-[4-(4-morpholinyl)phenyl]-1-butanone; and mixtures thereof. See, e.g., U.S. Pat. No. 9,090,765 to Henkel.

1. Polymerizable Liquids (Resins).

As noted above, the present invention provides a polymerizable liquid (or "resin") for producing three-dimensional objects by additive manufacturing. The resin may include:

(a) a polyvinyl siloxane (e.g., in an amount of from 30, 50, 60, or 75 percent by weight to 98 or 99.5 percent by weight);

(b) a polythiol crosslinker (e.g., an organic compound having two or more reactive primary or secondary thiol end or side groups) (e.g., in an amount of from 0.5 or 2 percent by weight to 25 or 75 percent by weight);

(c) a photoinitiator (e.g., a free radical photoinitiator) (e.g., in an amount of from 0.05 or 0.5 percent by weight to 2 or 5 percent by weight);

(d) optionally, a urethane (meth)acrylate oligomer (e.g., in an amount of from 0.01 or 0.1 percent by weight to 4, 6, 8, 10 or 50 percent by weight);

(e) optionally, a reactive diluent (e.g., in an amount of from 0.01 or 0.1 percent by weight to 4, 5, 6, 10 or 20 percent by weight);

(f) optionally, but in some embodiments preferably, a pigment or dye (e.g., in an amount of from 0.01 or 0.05 percent by weight to 0.5 or 2 percent by weight);

(g) optionally, but in some embodiments preferably, a reactive or non-reactive filler (e.g., in an amount of from 0.01 or 0.1 percent by weight to 30 or 60 percent by weight); and (h) optionally, at least one odor scavenger (e.g., in an amount of from 0.5 or 2 percent by weight to 15 or 20 percent by weight).

In some embodiments, the polyvinyl siloxane comprises siloxane monomers, oligomers, polymers, or combinations thereof.

In some embodiments, the polyvinyl siloxane comprises silicone monomeric units, organosilane monomeric units, or a combination thereof.

In some embodiments, the polyvinyl siloxane comprises monomeric units of silicon atoms having one, two, three, or four oxygen linkages thereto (i.e., M, D, T, or Q monomeric units), including combinations thereof.

In some embodiments, the polymerizable liquid comprises an MM resin, an MD resin, a DT resin, an MT resin, an MDT resin, a DTQ resin, an MTQ resin, an MDTQ resin, a DQ resin, an MQ resin, a DTQ resin, an MTQ resin, an MDQ resin, or a polyhedral oligomeric silsesquioxane (POSS) resin.

Examples of suitable polythiol crosslinkers for use in the present invention include, but are not limited to:
  thioglycolic acid (CAS #68-11-1);
  glyceryl mercaptoacetate (CAS #30618-84-9);
  3-mercaptopropionic acid (CAS #107-96-0);
  butyl-3-mercaptopropionate (CAS #16215-21-7);
  2-ethylhexyl 3-mercaptopropionate (CAS #50448-95-8);
  2-ethylhexyl mercaptoacetate (CAS #7659-86-1);
  iso-octylmercaptoacetate (CAS #25103-09-7);
  iso-octyl 3-mercaptopropionate (CAS #30374-01-7);
  iso-tridecyl 3-mercaptopropionate (CAS #1040871-35-9);
  iso-tridecyl mercaptoacetate (CAS #57417-85-3);
  octadecyl 3-mercaptopropionate (CAS #31778-15-1);
  glycol dimercaptoacetate (GDMA) (CAS #123-81-9);
  glycol di(3-mercaptopropionate) (GDMP) (CAS #22504-50-3);
  trimethylolpropane tri(3-mercaptopropionate) (TMPMP) (CAS #33007-83-9);
  ethoxylated-trimethylolpropane tri(3-mercaptopropionate) (CAS #345352-19-4);
  tris[2-(3-mercaptopropionyloxy)ethyl]isocyanurate (TEMPIC) (CAS #36196-44-8);
  pentaerythritol tetramercaptoacetate (PETMA) (CAS #10193-99-4);
  pentaerythritol tetra(3-mercaptopropionate) (PETMP) (CAS #7575-23-7);
  dipentaerythritol hexa(3-mercaptopropionate) (Di-PETMP) (CAS #25359-71-1);
  polycaprolactone tetra(3-mercaptopropionate)(PCL4MP 1350)(CAS #1622079-69-9);
  1,4-bis(3-mercaptobutylyloxy) butane (CAS #594836-83-6);
  1,3,5-tris(3-mercaptobutyloxethyl)-1,3,5-triazine-2,4,6 (1H,3H,5H)-trione;
  pentaerythritol tetrakis(3-mercaptopropionate) (CAS #31775-89-0);
  methyl thioglycolate (CAS #2365-48-2);
  (3-mercaptopropyl)trimethoxysilane (CAS #4420-74-0);
  2,2'-(ethylenedioxy)diethanethiol (CAS #14970-87-7);
  hexa(ethylene glycol) dithiol (CAS #89141-22-0);
  (mercaptopropyl)methylsiloxane homopolymer (CAS #102783-03-9);
  (mercaptopropyl)methylsiloxane-dimethylsiloxane copolymer (CAS #102783-03-9);
  thiol-terminated polydimethylsiloxane;
  thiolated polyhedral oligomeric silsesquioxane (POSS); and combinations thereof.

In some embodiments, the urethane (meth)acrylate oligomer comprises isocyanate-terminated oligomer end-capped with reactive (meth)acrylate (e.g., having a reactive epoxy, alkene, alkyne, or thiol terminal group).

In some embodiments, the reactive diluent comprises an acrylate, a methacrylate, a styrene, an acrylic acid, a vinylamide, a vinyl ether, a vinyl ester, polymers containing any one or more of the foregoing, and combinations of two or more of the foregoing.

In some embodiments, the pigment or dye comprises titanium dioxide, carbon black, an organic ultraviolet light absorber, or a combination thereof.

In some embodiments, the liquid has a viscosity of from 100 cP to 50,000 cP at room temperature.

In some embodiments, the polyvinyl siloxane and the polythiol are included in the liquid in a vinyl to thiol ratio of from 1:50 to 2:1 (number of vinyl groups:number of thiol groups), such as a ratio of from 1:20 to 1.5:1 (number of vinyl groups:number of thiol groups).

In some embodiments, the reactive filler comprises solid or porous, organic or inorganic, particles (e.g., microparticles, nanoparticles) having reactive thiol or vinyl groups coupled thereto, and/or wherein the non-reactive filler comprises solid or porous, organic or inorganic, particles (e.g., microparticles, nanoparticles) having coupled thereto capping agents that do not participate in the thiol-ene reaction during photopolymerization.

In some embodiments, the odor scavenger comprises at least one, or in some embodiments two or all three of, a constituent from the following three categories:

(a) Odor Absorbents/Adsorbents: The odor absorbents/adsorbents include, but not limited to, carbon black, zeolite, $\alpha$-/$\beta$-/$\gamma$-cyclodextrin, chitosan, etc.

(b) Blocked Isocyanate Odor Scavenger: The blocked or reactive blocked isocyanate (e.g., prepolymer) odor scavengers may include a polyisocyanate oligomer produced by the reaction of at least one diisocyanate, e.g., a diisocyanate such as hexamethylene diisocyanate (HDI), bis-(4-isocyanatocyclohexyl)methane (HMDI), isophorone diisocyanate (IPDI), etc., a triisocyanate, etc., with at least one polyol, e.g., a polyether or polyester or polybutadiene or polysiloxane diol. In some embodiments, the blocked prepolymer is blocked by reaction of a polyisocyanate with a blocking agent including, but not limited to, diethyl malonate (DEM), 3,5-dimethylpyrazole (DMP), methylethylketoxime (MEKO), caprolactam, etc. In some embodiments, the reactive blocked prepolymer is blocked by reaction of a polyisocyanate with an amine (meth)acrylate monomer blocking agent (e.g., tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof.

(c) Multi-functional Epoxy Odor Scavenger: In some embodiments, the multi-functional epoxy odor scavengers include, but are not limited to, bisphenol A diglycidyl ether (BADGE), bisphenol F diglycidyl ether (BFDGE), mono-phenyl functional tris(epoxy terminated polydimethylsiloxane), epoxypropoxypropyl terminated polydimethylsiloxane, glycidyl epoxy functionalized POSS cage mixture, ERISYS® GE Series glycidyl ether monomers and modifiers, etc. Catalysts may be used along with the epoxy odor scavengers to improve reaction rate and conversion of epoxy-thiol cure. Amines and imidazoles are common catalysts for accelerating co-reactive epoxy cure. Examples of these catalysts include, but are not limited to, triethanolamine (TEA), benzyldimethylamine (BDMA), 1-methylimidazole, (dimethylaminomethyl) phenol, 2,4,6-Tris(dimethylaminomethyl)phenol, vinylphoshonic acid, an encapsulated imidazole (Technicure® LC-80). Some epoxy curing agents are self-accelerating and can act as a catalyst for epoxy-thiol cure. Examples of these catalysts include, but are not limited to, dicyandiamide (DICY) and N,N-dimethyl phenyl urea (Technicure® PDU-250). Co-reactive epoxy curing can also be accelerated by Bronsted acid or Lewis acid. (WO1994004582 A1). Examples of these catalysts include, but are not limited to, vinylphosphonic acid, sulfonic acids, and zinc chloride. The catalysts may be included in the polymerizable liquid in any suitable amount, typically from 0.1 or 0.5 percent by weight, up to about 10 or 15 percent by weight, or more.

Additional Resin Ingredients.

The liquid resin or polymerizable material can have (among other things) solid particles suspended or dispersed therein. Any suitable solid particle can be used, depending upon the end product being fabricated. The particles can be metallic, organic/polymeric, inorganic, or composites or mixtures thereof. The particles can be nonconductive, semiconductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 $\mu$m average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Dyes/Non-Reactive Light Absorbers.

In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxypenyltriazine, and/or benzotriazole ultraviolet light absorber (e.g., Mayzo BLS® 1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058, 6,916,867, 7,157,586, and 7,695,643, the disclosures of which are incorporated herein by reference.

Fillers.

Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners.

One or more polymeric and/or inorganic tougheners can be used as a filler in the present invention. See generally US Patent Application Publication No. 2015/0215430. The toughener may be uniformly distributed in the form of particles in the cured product. The particles could be less than 5 microns (μm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-Shell Rubbers.

Core-shell rubbers are particulate materials (particles) having a rubbery core. Such materials are known and described in, for example, US Patent Application Publication No. 2015/0184039, as well as US Patent Application Publication No. 2015/0240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257, and Kaneka Kane Ace MX 120 core-shell rubber dispersions, and mixtures thereof.

Organic Diluents.

In some embodiments, diluents for use in the present invention are preferably reactive organic diluents; that is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Centigrade). Suitable examples of diluents include, but are not limited to, N,N-dimethylacrylamide, N-vinyl-2-pyrrolidone, and N-vinyl formamide, or a mixture of two or more thereof. The diluent may be included in the polymerizable liquid in any suitable amount, typically from 1, 5 or 10 percent by weight, up to about 30 or 40 percent by weight, or more.

Accelerators.

In some embodiments, the liquid may include a deoxygenating compound as an accelerator of stereolithography (particularly CLIP). An example of a suitable such accelerator is triphenylphosphine.

2. Production by Additive Manufacturing.

Polymerizable liquids or resins as described herein may be used to make three-dimensional objects, in a "light" cure or photopolymerization step (typically by additive manufacturing), which in some embodiments generates a final product, and in other embodiments generates a "green" intermediate object, followed in those latter embodiments by a second (typically heat) cure of that intermediate object to produce the final object.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, U.S. Pat. Nos. 9,211,678, 9,205,601, and 9,216,546, and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (2016). In some embodiments, CLIP employs features of a bottom-up three-dimensional fabrication as described above, but the irradiating and/or advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone in some embodiments comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

After the intermediate three-dimensional object is formed, it is optionally washed, optionally dried (e.g., air dried) and/or rinsed (in any sequence). It is then further cured, preferably by heating (although further curing may in some embodiments be concurrent with the first cure, or may be by different mechanisms such as contacting to water, as described in U.S. Pat. No. 9,453,142 to Rolland et al.).

3. Washing.

Objects as described above can be washed in any suitable apparatus, preferably with a wash liquid.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof.

The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

Examples of alcohol organic solvents that may be used in the present invention include, but are not limited to, aliphatic and aromatic alcohols such as 2-ethyl hexanol, glycerol, cyclohexanol, ethylene glycol, propylene glycol, di-propylene glycol, 1,4-butanediol, isoamyl alcohol, 1,2-propanediol, 1,3-propanediol, benzyl alcohol, 2-pentanol, 1-butanol, 2-butanol, methanol, ethanol, t-butanol, 2-propanol, 1-propanol, 2-methoxyethanol, tetrahydrofuryl alcohol, benzyl alcohol, etc., including combinations thereof. In some embodiments, a C1-C6 or C1-C4 aliphatic alcohol is preferred.

Examples of ester organic solvents that may be used to carry out the present invention include, but are not limited to, t-butyl acetate, n-octyl acetate, butyl acetate, ethylene carbonate, propylene carbonate, butylenes carbonate, glycerol carbonate, isopropyl acetate, ethyl lactate, propyl acetate, dimethyl carbonate, methyl lactate, ethyl acetate, ethyl propionate, methyl acetate, ethyl formate etc., including combinations thereof.

Examples of dibasic ester organic solvents include, but are not limited to, dimethyl esters of succinic acid, glutaric acid, adipic acid, etc., including combinations thereof.

Examples of ketone organic solvents that may be used to carry out the present invention include, but are not limited to, cyclohexanone, cyclopentanone, 2-pentanone, 3-pentanone, methylisobutyl ketone, acetone, methylethyl ketone, etc., including combinations thereof.

Examples of acid organic solvents that may be used to carry out the present invention include, but are not limited to, propionic acid, acetic anhydride, acetic acid, etc., including combinations thereof.

Examples of aromatic organic solvents that may be used to carry out the present invention include, but are not limited to, mesitylene, cumene, p-xylene, toluene, benzene, etc., including combinations thereof.

Examples of hydrocarbon (i.e., aliphatic) organic solvents that may be used to carry out the present invention include, but are not limited to, cis-decalin, ISOPAR™ G, isooctane, methyl cyclohexane, cyclohexane, heptane, pentane, methylcyclopentane, 2-methylpentane, hexane, petroleum spirit, etc., including combinations thereof.

Examples of ether organic solvents that may be used to carry out the present invention include, but are not limited to, di(ethylene glycol), ethoxybenzene, tri(ethylene glycol), sulfolane, DEG monobutyl ether, anisole, diphenyl ether, dibutyl ether, t-amyl methyl ether, t-butylmethyl ether, cyclopentyl methyl ether, t-butyl ethyl ether, 2-methyltetrahydrofuran, diethyl ether, bis(2-methoxyethyl) ether, dimethyl ether, 1,4-dioxane, tetrahydrofuran, 1,2-dimethoxyethane, diisopropyl ether, etc., including combinations thereof.

Examples of dipolar aprotic organic solvents that may be used to carry out the present invention include, but are not limited to, dimethylpropylene urea, dimethyl sulphoxide, formamide, dimethyl formamide, N-methylformamide, N-methyl pyrrolidone, propanenitrile, dimethyl acetamide, acetonitrile, etc., including combinations thereof.

Examples of halogenated organic solvents that may be used to carry out the present invention include, but are not limited to, 1,2-dichlorobenzene, 1,2,4-trichlorobenzene, chlorobenzene, trichloroacetonitrile, chloroacetic acid, trichloroacetic acid, perfluorotoluene, perfluorocyclohexane, carbon tetrachloride, dichloromethane, perfluorohexane, fluorobenzene, chloroform, perfluorocyclic ether, trifluoroacetic acid, trifluorotoluene, 1,2-dichloroethane, 2,2,2-trifluoroethanol, etc., including combinations thereof.

Examples of base organic solvents that may be used to carry out the present invention include, but are not limited to, N,N-dimethylaniline, triethylamine, pyridine, etc., including combinations thereof.

Examples of other organic solvents that may be used to carry out the present invention include, but are not limited to, nitromethane, carbon disulfide, etc., including combinations thereof.

Examples of surfactants include, but are not limited to, anionic surfactants (e.g., sulfates, sulfonates, carboxylates, and phosphate esters), cationic surfactants, zwitterionic surfactants, nonionic surfactants, etc., including combinations thereof. Common examples include, but are not limited to, sodium stearate, linear alkylbenzenesulfonates, lignin sulfonates, fatty alcohol ethoxylates, alkylphenol ethoxylates, etc., including combinations thereof. Numerous examples additional examples of suitable surfactants are known, some of which are described in U.S. Pat. Nos. 9,198,847, 9,175,248, 9,121,000, 9,120,997, 9,095,787, 9,068,152, 9,023,782, and 8,765,108.

Examples of chelants (chelating agents) include, but are not limited to, ethylenediamine tetraacetic acid, phosphates, nitrilotriacetic acid (NTA), citrates, silicates, and polymers of acrylic and maleic acid.

Examples of enzymes that may be included in the wash liquid include, but are not limited to, proteases, amylases, lipases, cellulases, etc., including mixtures thereof. See, e.g., U.S. Pat. Nos. 7,183,248, 6,063,206.

In some embodiments, the wash liquid can be an aqueous solution of ethoxylated alcohol, sodium citrate, tetrasodium N,N-bis(carboxymethyl)-L-glutamate, sodium carbonate, citric acid, and isothiazolinone mixture. One particular example thereof is SIMPLE GREEN® all purpose cleaner (Sunshine Makers Inc., Huntington Beach, Calif., USA), used per se or mixed with additional water.

In some embodiments, the wash liquid can be an aqueous solution comprised of of 2-butoxyethanol, sodium metasilicate, and sodium hydroxide. One particular example thereof is PURPLE POWER™ degreaser/cleaner (Aiken Chemical Co., Greenville, S. C., USA), used per se or mixed with additional water.

In some embodiments, the wash liquid can be ethyl lactate, alone or with a co-solvent. One particular example thereof is BIO-SOLV™ solvent replacement (Bio Brands LLC, Cinnaminson, N.J., USA), used per se or mixed with water.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.

Examples of hydrochlorofluorocarbon solvents that may be used to carry out the present invention include, but are not limited to, 3,3-Dichloro-1,1,1,2,2-pentafluoropropane, 1,3-Dichloro-1,1,2,2,3-pentafluoropropane, 1,1-Dichloro-1-fluoroethane, etc., including mixtures thereof.

Examples of hydrofluoroether solvents that may be used to carry out the present, invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M), Novec 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

In some embodiments, the wash liquid comprises an azeotropic mixture comprising, consisting of, or consisting essentially of a first organic solvent (e.g., a hydrofluorocarbon solvent, a hydrochlorofluorocarbon solvent, a hydrofluoroether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, tert-butanol, etc.; e.g., in an amount of from 1 to 15 or 20 percent by weight). Additional ingredients such as surfactants or chelants may optionally be included. In some embodiments, the azeotropic wash liquid may provide superior cleaning properties, and/or enhanced recyclability, of the wash liquid. Additional examples of suitable azeotropic wash liquids include, but are not limited to, those set forth in U.S. Pat. Nos. 6,008,179; 6,426,327; 6,753,304; 6,288,018; 6,646,020; 6,699,829; 5,824,634; 5,196,137; 6,689,734; and 5,773,403, the disclosures of which are incorporated by reference herein in their entirety.

When the wash liquid includes ingredients that are not desired for carrying into the further curing step, in some embodiments the initial wash with the wash liquid can be followed with a further rinsing step with a rinse liquid, such as water (e.g., distilled and/or deionized water), or a mixture of water and an alcohol such as isopropanol.

4. Further Curing.

After washing, the object is in some embodiments further cured, preferably by heating or baking.

Heating may be active heating (e.g., in an oven, such as an electric, gas, solar oven or microwave oven, heated bath, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road Round Lake, Ill. 60073-2898 USA, Davron Technologies, 4563 Pinnacle Lane, Chattanooga, Tenn. 37415 USA, Despatch Thermal Processing Technology, 8860 207th Street, Minneapolis, Minn. 55044 USA, and others.

In other embodiments, the heating step is carried out in an inert liquid bath. Suitable inert liquids may be aqueous liquids (i.e., pure water, salt solutions, etc.), organic liquids (e.g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT® inert liquids from 3M Company), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof (see, e.g., U.S. Pat. No. 5,506,007).

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

The present invention is explained in greater detail in the following non-limiting examples.

Example 1

Photopolymerizable Composition for 3D Printing

Scheme 1

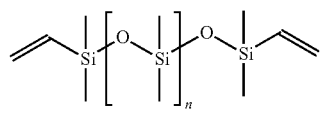

13
-continued
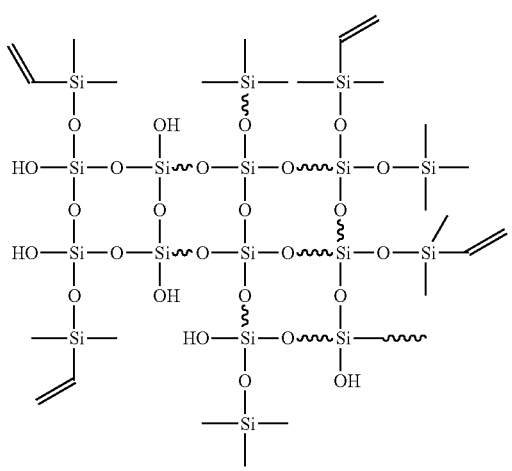
14
-continued
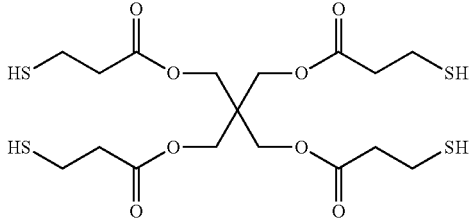
62.09 g of Dow Corning Sylgard® 184 base was mixed with 6.86 g of pentaerythritol tetra(3-mercaptopropionate) (THIOCURE® PETMP) and 1.05 g of 2,4,6-trimethylbenzoyl-diphenylphosphine oxide (PL-TPO-L) using an ARE-310 THINKY™ mixer for 15 minutes at 2,000 rpm to produce a homogeneous solution thereof.
Example 2
Production of Objects from Composition of Example 1
Scheme 2
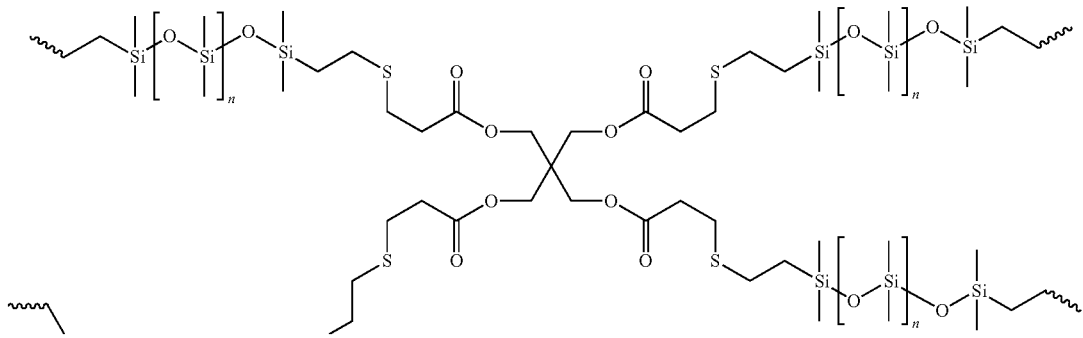
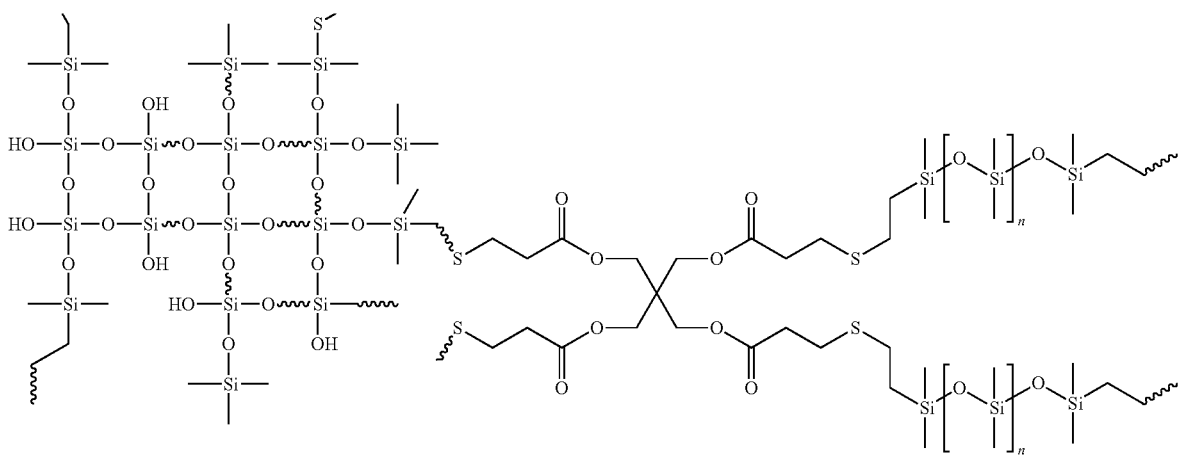

The homogenous solution of Example 1 was loaded into a continuous liquid interface production (CLIP) additive manufacturing printer (Carbon, Inc., Redwood City, Calif.) and ultraviolet curing produced three-dimensional objects on the platform. The three-dimensional objects were then flood cured using a broadband UV lamp, washed with isopropyl alcohol, and thermally cured at 120° C. overnight to render the elastomeric final products with Shore A hardness around 42.

Example 3

Photopolymerizable Composition for 3D Printing

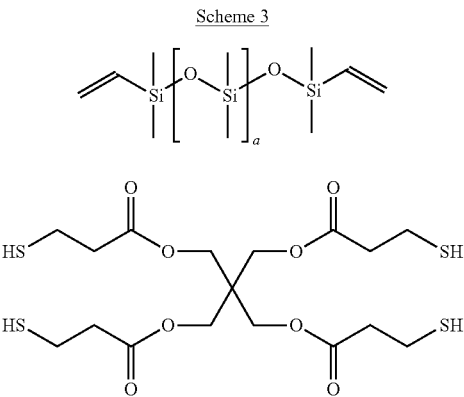

Scheme 3

62.09 g of vinyl-terminated polydimethylsiloxane (Mw~25,000) was mixed with 6.86 g of pentaerythritol tetra(3-mercaptopropionate) (THIOCURE® PETMP) and 1.05 g of 2,4,6-trimethylbenzoyl-diphenylphosphine oxide (PL-TPO-L) using an ARE-310 THINKY™ mixer for 15 minutes at 2,000 rpm to produce a homogeneous solution thereof.

Example 4

Production of Objects from Composition of Example 3

The homogenous solution of Example 3 was loaded into a continuous liquid interface production (CLIP) additive manufacturing printer and ultraviolet curing produced three-dimensional objects on the platform. The three-dimensional objects were then flood cured using a broadband UV lamp, washed with isopropyl alcohol, and thermally cured at 120° C. overnight to render the elastomeric final products.

Example 5

Photopolymerizable Composition for 3D Printing

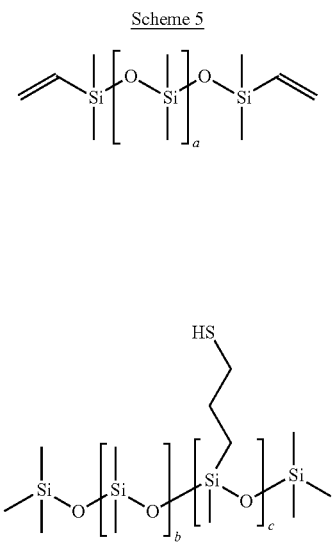

Scheme 5

62.09 g of vinyl-terminated polydimethylsiloxane (Mw~25,000) was mixed with 6.86 g of (mercaptopropyl)methylsiloxane(13-17%)-dimethylsilxane copolymer and 1.05 g of 2,4,6-trimethylbenzoyl-diphenylphosphine oxide (PL-TPO-L) using an ARE-310 THINKY™ mixer for 15 minutes at 2,000 rpm to produce a homogeneous solution.

Scheme 4

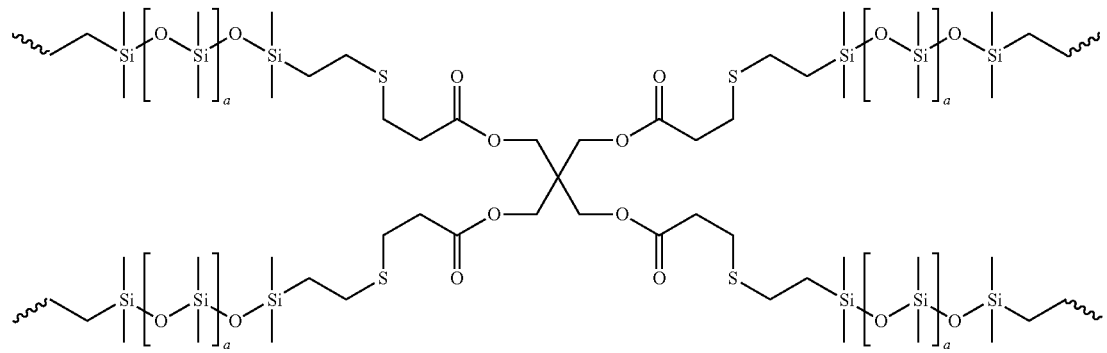

Example 6

Production of Objects from Composition of Example 5

Scheme 6

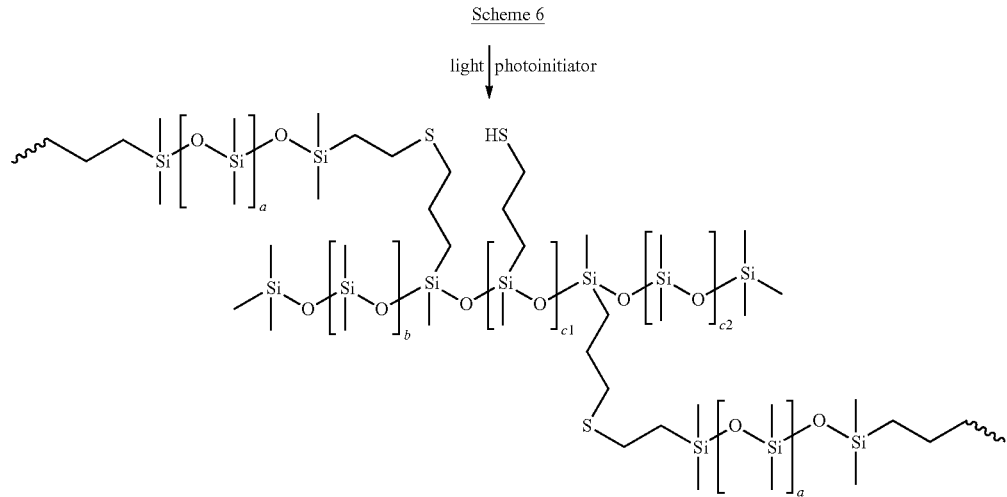

The homogenous solution of Example 5 was loaded into a continuous liquid interface production (CLIP) additive manufacturing printer and ultraviolet curing produced three-dimensional objects on the platform. The three-dimensional objects were then flood cured using a broadband UV lamp, washed with isopropyl alcohol, and thermally cured at 120° C. overnight to render the elastomeric final products.

Example 7

Photopolymerizable Composition for 3D Printing 70.0 g of Sylgard® 184 Base, 2.8 g of pentaerythritol tetra(3-mercaptopropionate) (THIOCURE® PETMP), 4.0 g of Blanova® DS 911 Zeolite, and 2.5 g of 2,4,6-trimethylbenzoyl-diphenylphosphine oxide (PL-TPO-L) were mixed thoroughly using an ARE-310 THINKY™ mixer for 15 minutes at 2,000 rpm to produce a homogeneous solution.

Example 8

Production of Objects from Composition of Example 7

The homogenous solution of Example 7 was loaded into a continuous liquid interface production (CLIP) additive manufacturing printer and ultraviolet curing produced three-dimensional objects on the platform. The three-dimensional objects were then flood cured using a broadband UV lamp, washed with isopropyl alcohol, and thermally cured at 120° C. overnight to render the elastomeric final products.

Example 9

Photopolymerizable Composition for 3D Printing 70.0 g of Sylgard® 184 Base, 2.8 g of pentaerythritol tetra(3-mercaptopropionate) (THIOCURE® PETMP), 10.0 g of Desmodur® BL 3175, and 2.5 g of 2,4,6-trimethylbenzoyl-diphenylphosphine oxide (PL-TPO-L) were mixed thoroughly using an ARE-310 THINKY™ mixer for 15 minutes at 2,000 rpm to produce a homogeneous solution.

Example 10

Production of Objects from Composition of Example 9

The homogenous solution of Example 9 was loaded into a continuous liquid interface production (CLIP) additive manufacturing printer and ultraviolet curing produced three-dimensional objects on the platform. The three-dimensional objects were then flood cured using a broadband UV lamp, washed with isopropyl alcohol, and thermally cured at 120° C. overnight to render the elastomeric final products.

Example 11

Photopolymerizable Composition for 3D Printing 70.0 g of Sylgard® 184 Base, 2.8 g of pentaerythritol tetra(3-mercaptopropionate) (THIOCURE® PETMP), 2.88 g of bisphenol A diglycidyl ether (BADGE), and 2.5 g of 2,4,6-trimethylbenzoyl-diphenylphosphine oxide (PL-TPO-L) were mixed thoroughly using an ARE-310 THINKY™ mixer for 15 minutes at 2,000 rpm to produce a homogeneous solution. The mixture was then mixed with triethanolamine (TEA) using an ARE-310 THINKY™ mixer for 1 minutes at 2,000 rpm.

Example 12

Production of Objects from Composition of Example 11

The homogenous solution of Example 11 was loaded into a continuous liquid interface production (CLIP) additive manufacturing printer and ultraviolet curing produced three-dimensional objects on the platform. The three-dimensional objects were then flood cured using a broadband UV lamp, washed with isopropyl alcohol, and thermally cured at 120° C. overnight to render the elastomeric final products with Shore A hardness around 31.

Example 13

Photopolymerizable Composition for 3D Printing 70.0 g of Sylgard® 184 Base, 2.8 g of pentaerythritol tetra(3-mercaptopropionate) (THIOCURE® PETMP), 2.88 g of bisphenol A diglycidyl ether (BADGE), 4.0 g of Blanova® DS 911 Zeolite, and 2.5 g of 2,4,6-trimethylbenzoyl-diphenylphosphine oxide (PL-TPO-L) were mixed thoroughly using an ARE-310 THINKY™ mixer for 15 minutes at 2,000 rpm to produce a homogeneous solution. The mixture was then mixed with triethanolamine (TEA) using an ARE-310 THINKY™ mixer for 1 minutes at 2,000 rpm.

Example 14

Production of Objects from Composition of Example 13

The homogenous solution of Example 13 was loaded into a continuous liquid interface production (CLIP) additive manufacturing printer and ultraviolet curing produced three-dimensional objects on the platform. The three-dimensional objects were then flood cured using a broadband UV lamp, washed with isopropyl alcohol, and thermally cured at 120° C. overnight to render the elastomeric final products with Shore A hardness around 35.

(c) a photoinitiator;
(d) optionally, a urethane (meth)acrylate oligomer;
(e) optionally, a reactive diluent;
(f) optionally, a pigment or dye;
(g) optionally, a reactive or non-reactive filler; and
(h) an odor scavenger, said odor scavenger comprising a blocked isocyanate odor scavenger or a multi-functional epoxy odor scavenger.

2. The liquid of claim 1, wherein said polyvinyl siloxane comprises siloxane monomers, oligomers, polymers, or a combination thereof.

3. The liquid of claim 1, wherein said polyvinyl siloxane comprises silicone monomeric units, organosilane monomeric units, or a combination thereof.

4. The liquid of claim 1, wherein said polyvinyl siloxane comprises monomeric units of silicon atoms having one, two, three, or four oxygen linkages thereto, or a combination thereof.

5. The liquid of claim 1, wherein said polyvinyl siloxane comprises an MM resin, an MD resin, a DT resin, an MT resin, an MDT resin, a DTQ resin, an MTQ resin, an MDTQ resin, a DQ resin, an MQ resin, a DTQ resin, an MTQ resin, an MDQ resin, or a polyhedral oligomeric silsesquioxane (POSS) resin.

6. The liquid of claim 1, wherein said polythiol crosslinker is selected from the group consisting of thioglycolic acid, glyceryl mercaptoacetate, 3-mercaptopropionic acid, butyl-3-mercaptopropionate, 2-ethylhexyl 3-mercaptopropionate, 2-ethylhexyl mercaptoacetate, iso-octylmercaptoacetate, iso-octyl 3-mercaptopropionate, iso-tridecyl 3-mercaptopropionate, iso-tridecyl mercaptoacetate, octadecyl 3-mercaptopropionate, glycol dimercaptoacetate (GDMA), glycol di(3-mercaptopropionate) (GDMP), trimethylolpro-

TABLE 1

Example Compositions

| | Composition | | | | | | | | | |
|---|---|---|---|---|---|---|---|---|---|---|
| | Polysiloxane Resin | | | | | Odor Scavenger | | | | |
| | Vinyl Terminated | | Polythiol Crosslinker | | | Blanova | | | | |
| Example | Sylgard ® 184 Base | PDMS (Mw ~25k) | THIOCURE ® PETMP | Thiolated PDMS | PI PL-TPO-L | DS 911 Zeolite | Desmodur ® BL 3175 | BADGE | TEA | Odor |
| 1 & 2 | 88.7 | 0.0 | 9.8 | 0.0 | 1.5 | 0.0 | 0.0 | 0.0 | 0.0 | Strong |
| 3 & 4 | 0.0 | 88.7 | 9.8 | 0.0 | 1.5 | 0.0 | 0.0 | 0.0 | 0.0 | Strong |
| 5 & 6 | 0.0 | 0.0 | 0.0 | 9.8 | 1.5 | 0.0 | 0.0 | 0.0 | 0.0 | Strong |
| 7 & 8 | 88.3 | 0.0 | 3.5 | 0.0 | 3.2 | 5.0 | 0.0 | 0.0 | 0.0 | Mild |
| 9 & 10 | 82.1 | 0.0 | 3.3 | 0.0 | 2.9 | 0.0 | 11.7 | 0.0 | 0.0 | Mild |
| 11 & 12 | 89.3 | 0.0 | 3.6 | 0.0 | 3.2 | 0.0 | 0.0 | 3.7 | 0.2 | Mild |
| 13 & 14 | 85.0 | 0.0 | 3.4 | 0.0 | 3.0 | 4.9 | 0.0 | 3.5 | 0.2 | Low |

Notes:
Vinyl Terminated PDMS: Poly(dimethylsiloxane), vinyl terminated, average $M_w$ ~25,000 (product 433012 from Sigma Aldrich)
Thiolated PDMS: 13-17% (mercaptopropyl)methylsiloxane-dimethylsiloxane copolymer (product SMS-142 from Gelest)
Desmodur BL 3175 ®: Blocked aliphatic HDI-polyisocyanate from Cavestro The foregoing is illustrative of the present invention, and is not to be construed as limiting thereof. The invention is defined by the following claims, with equivalents of the claims to be included therein.

We claim:
1. A polymerizable liquid for producing three-dimensional objects by additive manufacturing, comprising:
(a) a polyvinyl siloxane;
(b) a polythiol crosslinker;

pane tri(3-mercaptopropionate) (TMPMP), ethoxylated-trimethylolpropane tri(3-mercaptopropionate), tris[2-(3-mercaptopropionyloxy)ethyl]isocyanurate (TEMPIC), pentaerythritol tetramercaptoacetate (PETMA), pentaerythritol tetra(3-mercaptopropionate) (PETMP), dipentaerythritol hexa(3-mercaptopropionate) (DiPETMP), polycaprolactone tetra(3-mercaptopropionate), 1, 4-bis(3-mercaptobutylyloxy) butane, 1,3,5-tris(3-mercaptobutyloxyethyl)-1,3,5-triazine-2,4,6 (1H,3H, 5H)- trione, pentaerythritol tetrakis(3-mercaptopropionate), methyl thioglycolate, (3-mercaptopropyl)trimethoxysilane, 2,2 '-(ethylenedioxy)diethanethiol, hexa(ethylene glycol) dithiol, (mercaptopropyl)methyl siloxane homopolymer, (mercaptopropyl)methyl siloxane-di methyl siloxane copolymer, thiol-terminated polydimethylsiloxane, thiolated polyhedral oligomeric silsesquioxane (POSS), and combinations thereof.

7. The liquid of claim 1, wherein said photoinitiator comprises a type I free radical photoinitiator and/or a type II free radical photoinitiator.

8. The liquid of claim 1, wherein said photoinitiator is selected from group consisting of: diphenyl(2,4,6-trimethylbenzoyl)phosphine oxide (TPO), diphenylphosphinyl(2,4,6-trimethylphenyl)methanone, benzophenone, substituted benzophenones, acetophenone, substituted acetophenones, benzoin, benzoin alkyl esters, xanthone, substituted xanthones, diethoxy-acetophenone, benzoin methyl ether, benzoin ethyl ether, benzoin isopropyl ether, diethoxyxanthone, chloro-thio-xanthone, N-methyl diethanol-amine-benzophenone, 2-hydroxy-2-methyl-1-phenyl-propan-1-one, 2-benzyl-2-(dimethylamino)-1-[4-(4-morpholinyl)phenyl]-1-butanone, and mixtures thereof.

9. The liquid of claim 1, wherein said urethane (meth) acrylate oligomer is present and comprises an isocyanate-terminated oligomer endcapped with reactive (meth)acrylate.

10. The liquid of claim 1, wherein said reactive diluent is present and comprises an acrylate, a methacrylate, a styrene, an acrylic acid, a vinylamide, a vinyl ether, a vinyl ester, a polymer containing any one or more of the foregoing, or a combination of two or more of the foregoing.

11. The liquid of claim 1, wherein said pigment or dye is present and comprises titanium dioxide, carbon black, an organic ultraviolet light absorber, or a combination of two or more thereof.

12. The liquid of claim 1, wherein said liquid has a viscosity of from 100 cP to 50,000 cP at room temperature.

13. The liquid of claim 1, wherein said polyvinyl siloxane and said polythiol are included in said liquid in a vinyl to thiol ratio of from 1:50 to 2:1 (number of vinyl groups: number of thiol groups).

14. The liquid of claim 1, wherein said reactive filler is present and comprises solid or porous, organic or inorganic, particles having reactive thiol or vinyl groups coupled thereto, and/or wherein said non-reactive filler is present and comprises solid or porous, organic or inorganic, particles having coupled thereto capping agents that do not participate in the thiol-ene reaction during photopolymerization.

15. The liquid of claim 1, wherein said odor scavenger further comprises an odor absorbent or adsorbent.

16. A polymerizable liquid for producing three-dimensional objects by additive manufacturing, comprising:
(a) a polyvinyl siloxane;
(b) a polythiol crosslinker;
(c) a photoinitiator;
(d) optionally, a urethane (meth)acrylate oligomer;
(e) optionally, a reactive diluent;
(f) optionally, a pigment or dye;
(g) optionally, a reactive or non-reactive filler; and
(h) an odor scavenger,
wherein said odor scavenger comprises:
   a combination of (i) at least one absorbent and/or adsorbent and (ii) at least one multi-functional epoxy odor scavenger; or
   a combination of (i) at least one absorbent and/or adsorbent, (ii) at least one blocked isocyanate odor scavenger and (iii) at least one multi-functional epoxy odor scavenger.

17. The liquid of claim 16, wherein said polythiol crosslinker is selected from the group consisting of thioglycolic acid, glyceryl mercaptoacetate, 3-mercaptopropionic acid, butyl-3-mercaptopropionate, 2-ethylhexyl 3-mercaptopropionate, 2-ethylhexyl mercaptoacetate, iso-octylmercaptoacetate, iso-octyl 3-mercaptopropionate, iso-tridecyl 3-mercaptopropionate, iso-tridecyl mercaptoacetate, octadecyl 3-mercaptopropionate, glycol dimercaptoacetate (GDMA), glycol di(3-mercaptopropionate) (GDMP), trimethylolpropane tri(3-mercaptopropionate) (TMPMP), ethoxylated-trimethylolpropane tri(3-mercaptopropionate), tris[2-(3-mercaptopropionyloxy)ethyl]isocyanurate (TEMPIC), pentaerythritol tetramercaptoacetate (PETMA), pentaerythritol tetra(3-mercaptopropionate) (PETMP), dipentaerythritol hexa(3-mercaptopropionate) (DiPETMP), polycaprolactone tetra(3-mercaptopropionate), 1, 4-bis(3-mercaptobutylyloxy) butane, 1,3,5-tris(3-mercaptobutyloxethyl)-1,3,5-triazine-2,4,6(1H,3H,5H)-trione, pentaerythritol tetrakis(3-mercaptopropionate), methyl thioglycolate, (3-mercaptopropyl)trimethoxysilane, 2,2'-(ethylenedioxy)diethanethiol, hexa(ethylene glycol) dithiol, (mercaptopropyl)methyl siloxane homopolymer, (mercaptopropyl)methylsiloxane-dimethylsiloxane copolymer, thiol-terminated polydimethylsiloxane, thiolated polyhedral oligomeric silsesquioxane (POSS), and combinations thereof.

18. The liquid of claim 16, wherein said urethane (meth) acrylate oligomer is present and comprises an isocyanate-terminated oligomer endcapped with reactive (meth)acrylate.

19. The liquid of claim 16, wherein said reactive diluent is present and comprises an acrylate, a methacrylate, a styrene, an acrylic acid, a vinylamide, a vinyl ether, a vinyl ester, a polymer containing any one or more of the foregoing, or a combination of two or more of the foregoing.

20. The liquid of claim 16, wherein said pigment or dye is present and comprises titanium dioxide, carbon black, an organic ultraviolet light absorber, or a combination of two or more thereof.

* * * * *

UNITED STATES PATENT AND TRADEMARK OFFICE
CERTIFICATE OF CORRECTION

PATENT NO. : 11,535,714 B2  
APPLICATION NO. : 16/759783  
DATED : December 27, 2022  
INVENTOR(S) : Kao et al.

It is certified that error appears in the above-identified patent and that said Letters Patent is hereby corrected as shown below:

On the Title Page

Item (56) References Cited, OTHER PUBLICATIONS, Page 2, Column 2: Please correct "Tubleston" to read --Tumbleston--

In the Specification

Columns 13-14, Scheme 2: Please delete the entirety of Scheme 2 and replace with the following:

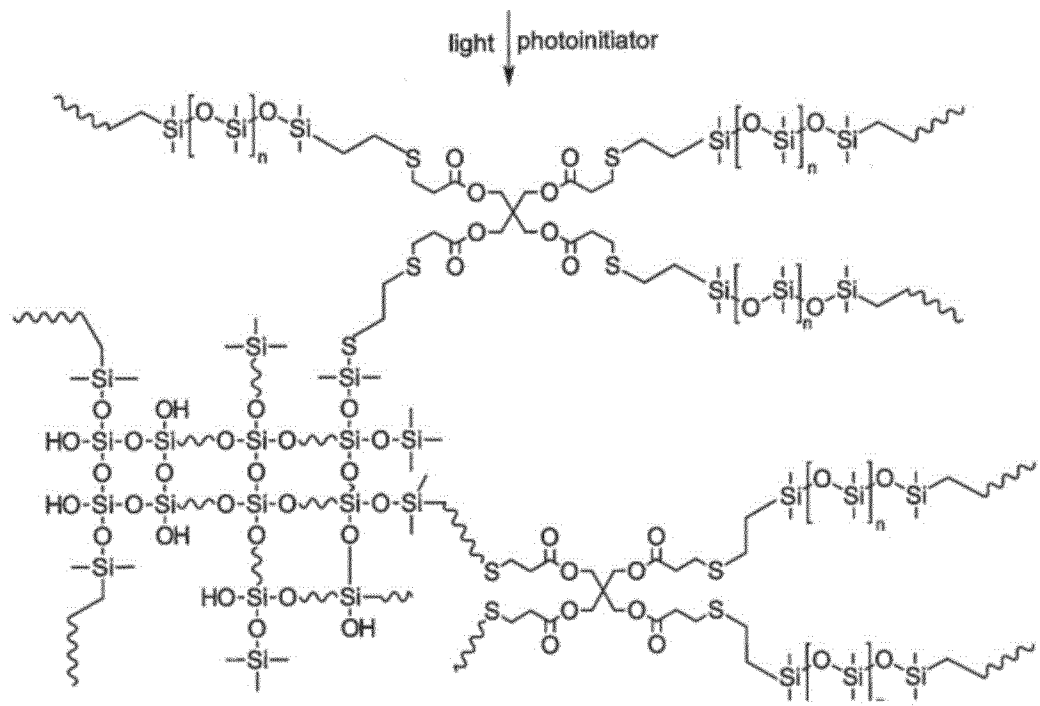

Signed and Sealed this  
Sixteenth Day of May, 2023

Katherine Kelly Vidal  
*Director of the United States Patent and Trademark Office*

CERTIFICATE OF CORRECTION (continued)
U.S. Pat. No. 11,535,714 B2

Column 16, Lines 39-40: Please correct "(Mw-25,000)" to read --(Mw~25,000)--

Column 16, Line 41: Please correct "dimethylsilxane" to read --dimethylsiloxane--

In the Claims

Column 21, Line 4, Claim 6: Please correct "methyl siloxane" to read --methylsiloxane--

Column 21, Line 5, Claim 6: Please correct "methyl siloxane-di methyl siloxane" to read --methylsiloxane-dimethylsiloxane--

Column 22, Line 36, Claim 17: Please correct "methyl siloxane" to read --methylsiloxane--